April 21, 1925.                                                                1,534,424
H. W. STARK ET AL
SHOCK ABSORBER FOR VEHICLES
Filed Dec. 5, 1921
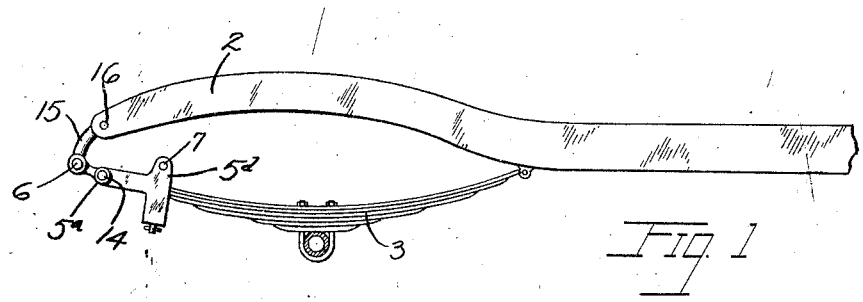
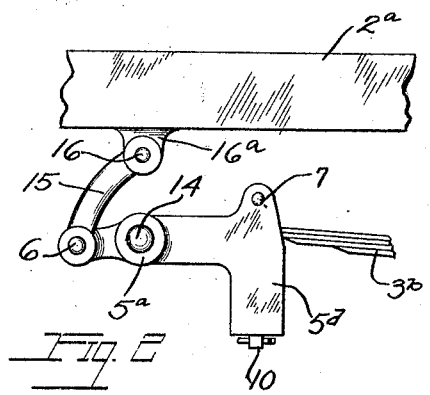
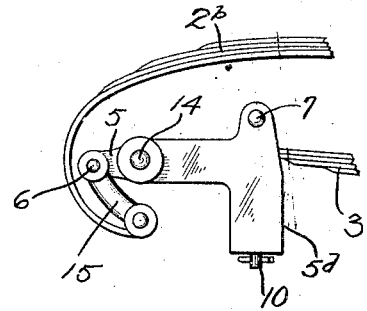
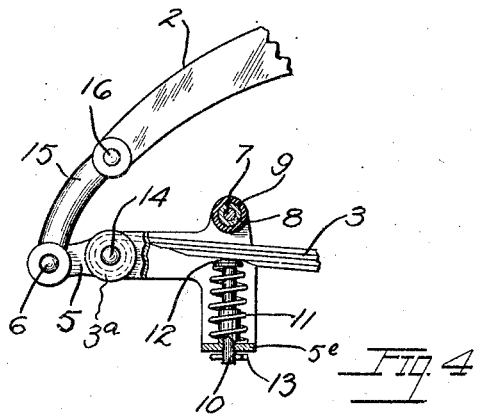
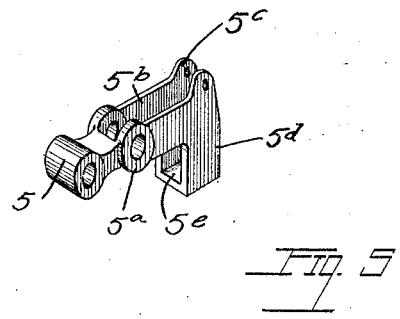
WITNESS
A. E. Alberg
INVENTORS
H. W. Stark and T. D. Reese
BY
White Prost & Evans
their ATTORNEYS Patented Apr. 21, 1925.

1,534,424

UNITED STATES PATENT OFFICE.

HUGO W. STARK AND THOMAS D. REESE, OF CUPERTINO, CALIFORNIA.

SHOCK ABSORBER FOR VEHICLES.

Application filed December 5, 1921. Serial No. 519,848.

*To all whom it may concern:*

Be it known that we, HUGO W. STARK and THOMAS D. REESE, citizens of the United States, and residents of Cupertino, county of Santa Clara, State of California, have invented a certain new and useful Shock Absorber for Vehicles, of which the following is a specification.

This invention relates to means interposed between the chassis frame and axle supported springs for absorbing shocks incident to the operation of a vehicle over a roadway.

It is one of the objects of the present invention to provide an extremely simple, substantial, practical and inexpensive type of shock absorbing device that may be readily incorporated in any chassis organizations and may be readily installed in completed chassis without necessitating any changes in the details of construction or alterations of the parts.

Another object of the invention is to provide a shock absorbing device which is adapted to be connected to a respective end of the axle supported spring and to be articulately connected to a part of the chassis frame or part attached thereto.

A further object is to provide a shock absorbing device consisting of a substantially rigid box-like lever adapted to be pivoted intermediate its ends upon an axle supported spring and which lever is provided with a cushioning spring which allows the yielding action of the lever upon the downward thrust of the attached chassis part and positively limits the swinging of the lever in one direction from one of its positions.

The invention possesses other objects and features of advantage, some of which, with the foregoing, will be made manifest in the following description of the preferred form of the invention, which is illustrated in the drawings accompanying and forming part of the specification. It is to be understood that it is not intended to limit the invention to the embodiment shown by the said drawings and description, as variations may be adopted within the scope of the invention as set forth in the claims.

Figure 1 is a side elevation of a fragment of the rear end of a chassis and spring of a vehicle, showing the device, as applied.

Fig. 2 is a side elevation showing the connection of the device to the chassis frame and to the rear end of a front spring.

Fig. 3 is a side elevation of the device, as applied to a type of rear end having a spring arm attached to the chassis frame and to which the device is connected.

Fig. 4 is a section on a somewhat larger scale in a vertical plane, longitudinally of the device.

Fig. 5 is a perspective of the detached and dismantled lever.

The device of the present invention is preferably embodied in a substantial, lever-like element which is of such construction that it may be readily introduced between the rear arm or horn 2 of a vehicle chassis frame and the rear end of a leaf spring 3 supported on an axle in any suitable manner and the same type of lever is also equally readily applied to an intermediate portion of the chassis frame $2^a$, as in Fig. 2, and may also be applied to a quarter elliptic rear end spring $2^b$, attached to the chassis frame, as shown in Fig. 3. As embodied in a device subjected to practical use, the lever comprises at one end, a tubular bearing boss 5 through which may be passed a pivot pin or bolt 6. The lever is provided contiguous to the boss 5 with spaced fulcrum bearings $5^a$, which are formed in side plates $5^b$ spaced a suitable distance according to the width of the spring 3 to which the lever is adapted to be connected, so that the side plates overlap the sides of the leaves of the spring. The upper corners of the side plates are provided with upstanding lugs or ears $5^c$ through which may be passed a fastening pin or bolt 7, which preferably is surrounded with a spacing sleeve 8, and around this is a cushioning sleeve, such as a piece of rubber hose, shown at 9. The lower corners of the side plates of the lever are extended downwardly a suitable distance, as at $5^d$ and are transversely connected by a seat forming portion $5^e$ through which passes a limiting pin 10 extending perpendicularly between the side plates of the lever and about which pin is compressed a cushion spring 11, engaging a washer 12 below the head of the stop pin 10, through the lower end of which may be passed a cotter-pin 13 to limit its upward movement.

The lever device with its attached spring 11 is, when completely assembled, readily connected to the chassis and vehicle spring 3 by the passage of a main pivot pin or bolt 14 through the side bearings 5ª of the plates and through the eye 3ª of the axle supported spring 3. The fastening pin or bolt 6 is then connected to the rear end of the chassis part 2, 2ª or 2ᵇ, through the medium of a pair of spaced and preferably arcuate shackle links 15, whose upper ends are connected by a pin or bolt 16 to the chassis frame or associated part. To limit the downward swinging movement of the end of the lever which overlaps the sides of the spring 3, the bolt 7 is passed through the ears 5ᵇ and the cushioning sleeve or rubber bumper 9 is then disposed across the top leaf of the spring 3, so that if the end of the lever connected to the bolt 6 tends to swing up, then the stop bumper 9 will bear down upon the top of the spring and limit the movement of the lever.

In operation of the device, when such an obstacle is encountered in the roadway as to tend to suddenly thrust the axle supported spring upwardly, the resistance of the frame 2 and the parts thereof attached to the lever at the boss 5, tends to swing the end of the lever which is contiguous to the spring 3, upwardly and this action is yieldingly resisted by the cushioning means, such as the spring 11, bearing the head of the stop pin 10 up against the lower surface of the contiguous leaf of the spring 3. As the spring 11 reaches a certain state of compression, the downward thrust of the frame 2 is then subjected to and carried by the main spring 3. As soon as the forces are again restored to normal, the spring 11 expands and restores the lever to a position with the stop device 9, carried on the cross pin 7, down to limiting engagement with the top of the spring 3.

In Figure 2 the same shock absorbing device is shown as connected by the shackle links 15 to a bearing part 16ª at the intermediate portion of the frame 2ª; the lever bearings 5ª being connected to the rear end of a front spring 3ᵇ. In Fig. 3, the device is shown as combined with a type of chassis construction in which there is a rearwardly extending spring arm 2ᵇ attached to the chassis frame. This arm is shown as curving under the rear end of the lever device and is connected to it by the inverted shackle links 15.

From the above it will be seen that we have provided an extremely simple and compact form of cushioning device consisting essentially of a substantial lever member which carries a cushioning device in the form of the spring 11, having a constant reaction against the contiguous end of a connected axle carried spring.

What is claimed is:

The combination with an axle supported leaf spring of a vehicle, of a lever pivoted intermediate its ends to the end of the spring, shackles connecting one end of the lever with the vehicle frame, said lever having side plates lying on opposite sides of the leaf spring, a seat connecting the side plates together below the spring, a pin extending through said seat into engagement with said spring and a coiled spring surrounding said pin and pressing it against said leaf spring.

In testimony whereof, we have hereunto set our hands.

HUGO W. STARK.
THOMAS D. REESE.